(12) United States Patent
Simone et al.

(10) Patent No.: US 11,383,259 B2
(45) Date of Patent: Jul. 12, 2022

(54) MACHINE AND METHOD FOR MAKING A PROTECTIVE JOINT ABOUT AN ANNULAR JUNCTION PORTION OF A PIPELINE

(71) Applicant: SAIPEM S.p.A., San Donato Milanese (IT)

(72) Inventors: Francesco Simone, San Donato Milanese (IT); Valerio Bregonzio, San Donato Milanese (IT); Momtchil Kaltchev, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

(21) Appl. No.: 17/272,552

(22) PCT Filed: Sep. 5, 2019

(86) PCT No.: PCT/IB2019/057490
§ 371 (c)(1),
(2) Date: Mar. 1, 2021

(87) PCT Pub. No.: WO2020/049498
PCT Pub. Date: Mar. 12, 2020

(65) Prior Publication Data
US 2021/0323018 A1 Oct. 21, 2021

(30) Foreign Application Priority Data
Sep. 7, 2018 (IT) .......................... 102018000008426

(51) Int. Cl.
*B05B 13/04* (2006.01)
*B05D 1/02* (2006.01)
(Continued)

(52) U.S. Cl.
CPC ............ *B05B 13/0436* (2013.01); *B05D 1/02* (2013.01); *B05D 1/265* (2013.01); *B05D 3/0218* (2013.01);
(Continued)

(58) Field of Classification Search
None
See application file for complete search history.

(56) References Cited

U.S. PATENT DOCUMENTS

2011/0159192 A1\* 6/2011 Daykin ............... B05B 13/0478
427/314

FOREIGN PATENT DOCUMENTS

| EP | 2 535 168 A1 | 12/2012 |
| WO | WO 2008/071773 A2 | 6/2008 |
| WO | WO 2014/057426 A1 | 4/2014 |

OTHER PUBLICATIONS

Notification Concerning Submission, Obtention or Transmittal of Priority Document for International Application No. PCT/IB2019/057490 dated Nov. 8, 2019.
(Continued)

*Primary Examiner* — Michael P. Rodriguez
(74) *Attorney, Agent, or Firm* — Neal, Gerber & Eisenberg LLP

(57) ABSTRACT

A machine for making a protective joint has a guide system, which is selectively clampable about a pipeline on opposite sides with respect to the annular junction portion and configured for defining an annular path about the annular junction portion; at least one heating unit moveable along the annular path and configured for heating the annular junction portion and moveable along the annular path; at least one spray unit moveable along the annular path and configured for applying at least one polymer material to the annular junction portion; and an extrusion die moveable
(Continued)

along the annular path and configured for applying a protective foil about the annular junction portion.

19 Claims, 8 Drawing Sheets

(51) Int. Cl.
*B05D 1/26* (2006.01)
*B05D 3/02* (2006.01)
*B05D 7/14* (2006.01)
*B29C 63/00* (2006.01)
*F16L 13/02* (2006.01)
*F16L 58/18* (2006.01)

(52) U.S. Cl.
CPC .......... *B05D 7/146* (2013.01); *B29C 63/0069* (2013.01); *F16L 13/0272* (2013.01); *F16L 58/181* (2013.01)

(56) References Cited

OTHER PUBLICATIONS

International Search Report and Written Opinion for International Application No. PCT/IB2019/057490 dated Dec. 17, 2019.

* cited by examiner

MACHINE AND METHOD FOR MAKING A PROTECTIVE JOINT ABOUT AN ANNULAR JUNCTION PORTION OF A PIPELINE

PRIORITY CLAIM

This application is a national stage application of PCT/IB2019/057490, filed on Sep. 5, 2019, which claims the benefit of and priority to Italian Patent Application No. 102018000008426, filed on Sep. 7, 2018, the entire contents of which are each incorporated by reference herein.

TECHNICAL FIELD

The present disclosure relates to a machine for making a protective joint about an annular junction portion of a pipeline for transporting hydrocarbons.

BACKGROUND

The pipelines for transporting hydrocarbons are composed of sections of pipe that are joined together. Each section of pipe usually comprises a metal cylinder, generally made of steel, on which a protective coating made of polymer material is applied, which has the function of protecting the metal pipe. Optionally, the pipe may have a further external coating made of gunite or concrete, the function of which is to weigh down the pipeline. The lengths at the free and opposite ends of each section of pipe are uncoated so that the steel cylinders can be welded together. Each of these uncoated lengths is generally referred to as a "cutback" in in this technical sector.

The joining operation, which can be carried out both in ground installations and in ships for laying submarine pipelines, involves welding the steel cylinders, generally in several welding passes. Once a welding ring has been made between two steel cylinders, an uncoated annular junction portion straddles the weld. As a result, during the assembly step, the pipeline has, in sequence, a plurality of annular junction portions, each of which is formed from two uncoated lengths placed next to each other and welded together, and, therefore, it is necessary to make a protective joint at each annular junction portion.

The making and application of the protective joint along each annular junction portion is in practice called "Field Joint Coating" and involves preparing the surface of the annular junction portion and coating the surface of the annular junction portion with polymer materials. In more detail, a plurality of operations need to be performed on each annular junction portion in accordance with the following sequence:

- grind the annular junction portion to remove impurities and oxidations from the surface of the annular junction portion and to give a certain roughness to that surface;
- heat the annular junction portion to facilitate the subsequent steps in the application of polymer materials;
- apply a relatively thin, so-called "primer" layer of polymer material, in particular epoxy resin, directly to the annular junction portion;
- apply a relatively thin layer of polymer material with adhesive properties over the previous layer;
- apply a relatively thick layer (thicker than the previous layers, in any case), generally known as the "top coat", to the adhesive layer.

The adhesive polymer material and the polymer material for making the "Top Coat" are selected from compatible materials for making a union by fusion.

The operations described are particularly critical when performed on a pipeline during assembly onboard a pipeline-laying ship because the space available is relatively limited and the pipeline, during assembly, is partially laid on the bed of a water body and cannot rotate about its longitudinal axis. In addition, the protective joint must meet certain quality requirements such as perfect adhesion to the pipeline and to the ends of the pre-existing coating. The protective joint must also guarantee a minimum thickness that varies according to the application and to the customer's requirements. In a pipeline-laying ship, the joining of the sections of pipe and the "Field Joint Coating" operations are performed in the respective workstations distributed along a pipeline advancement path. The average speed of advancement of the pipeline is a function of the maximum time taken in one of the work stations to carry out one or more operations. At present, the restoration of the coating, as a whole, is a relatively time-consuming operation. This is because the operations for heating the annular junction portion and the application of the different layers must necessarily be performed in a single station, so as to benefit from the heating of the annular junction portion and to avoid contamination between the application of the subsequent layers. The advancement speed of the pipeline and, consequently, of the pipeline-laying ship are affected by the relative slowness of the remaining operations required for the restoration of the protective coating at the annular junction portions.

SUMMARY

The purpose of the present disclosure is to provide a machine for making a protective joint about an annular junction portion of a pipeline that is capable of reducing the dwell time of the pipeline.

In accordance with the present disclosure, a machine is provided to make a protective joint about an annular junction portion of a pipeline, the machine comprising a selectively clampable guide system about a pipeline extending along a longitudinal axis on opposite sides with respect to an annular junction portion and configured to define an annular path about the annular junction portion; at least one heating unit moveable along the annular path and configured to heat the annular junction portion; at least one spray unit moveable along the annular path and configured to apply at least one polymer material to the annular junction portion; and one extrusion die moveable along the annular path and configured to apply a protective foil about the annular junction portion. In this way, during the step in which the guide system is coupled to the pipeline, it is possible to perform the heating operations, the application of powdered polymer material on the annular portion, and the application of the protective foil. Regardless of how the different operations are managed, a considerable saving of time results from only one coupling to the pipeline and one uncoupling from the pipeline being required to enable the execution of three separate operations. In addition, the heating operations and the application of polymer powders and of the protective foil can be performed in relative quick succession so as to prevent the cooling of the annular junction portion and to promote the forming of chemical bonds between the polymer materials. In other words, it is also possible to heat the annular junction portion to relatively low temperatures because the application of the polymer powders and of the protective foil can be performed in relative quick succession. This results in significant energy savings.

In particular, the heating unit, the spray unit, and the extrusion die have respective widths commensurate with the width of the annular junction portion so that they can perform their respective operations along the annular junction portion in a reduced number of revolutions about the pipeline. This configuration enables the number of revolutions of the heating unit, the spray unit, and the extrusion die, about the annular junction portion, to be minimized. The reduction in the number of revolutions is important because the heating unit must be powered by an electrical cable, the spray unit must be fed by a flexible conduit for feeding the powders, and the extrusion die must be fed by a conduit with polymer in a paste state.

In particular, the machine comprises a control system configured to control the positions of the heating unit, the spray unit, and the extrusion die along the annular path of the guide system. The control of the position is required to determine the sequence of the heating operations, the application of the powders and of the protective foil.

In accordance with the present disclosure, the control system is configured to control the operating status of the heating unit, the operating status of the spray unit, and the operating status of the extrusion die along the annular path of the guide system. In this way, it is possible to define the optimal sequence of the heating operations and the application of the powders and of the protective foil according to the absolute and relative positions of the heating unit, the spraying unit, and the extrusion die, and of their direction of advancement.

In particular, the machine comprises a carriage configured to advance along the annular path of the guide system in a first direction about the annular junction portion and in a second direction opposite to the first direction—the heating unit, the spray unit, and the extrusion die being mounted on said carriage. In this way, the machine is particularly relatively simple and the relative position between the heating unit, the spray unit, and the extrusion die is predefined.

In particular, the heating unit, the spray unit, and the extrusion die are arranged in sequence along the carriage. With this configuration, it is possible to carry out, in relative quick succession, the heating of the annular junction portion, the spraying of the powders on the annular junction portion just heated, and the application of the protective foil on the portion on which the powders have just been applied.

In accordance with a variant of the present disclosure, the machine comprises a further heating unit and a further spray unit mounted on the carriage. In this way, it is possible to reduce the heating and powder application times.

In particular, the two heating units are arranged at opposite ends of the carriage and, in certain embodiments, at 180° to each other, and each spray unit is arranged between the extrusion die and a respective spray unit.

According to a further alternative, the heating unit and the spray unit are integrated in an assembly comprising a plurality of nozzles, which are distributed along a direction parallel to the longitudinal axis of the pipeline, and a U-shaped inductor, which is arranged about the plurality of nozzles. In this way, the heating and the powder application can be carried out with alternating revolutions of 180° about the annular junction portion, while the application of the protective foil requires a slightly greater stroke than a complete revolution in order to overlap the corners of the protective foil.

A further purpose of the present disclosure is to provide a method for making a protective joint about an annular junction portion of a pipeline that mitigates certain of the drawbacks of certain of the prior art.

In accordance with the present disclosure, a method is provided for making a protective joint about an annular junction portion of a pipeline, the method comprising the following steps:
clamp a guide system to a pipeline and about an annular junction portion to define an annular path about the annular junction portion;
advance. simultaneously, at least one heating unit, at least one spray unit, and one extrusion die along the annular path;
heat the annular junction portion by the heating unit;
apply at least one polymer material to the annular junction portion by the spray unit;
apply a protective foil about the annular junction portion and about the end portions of the coating that delimit the annular junction portion by an extrusion die; and
uncouple the guide system from the pipeline.

The application of this method enables the time it takes to make the protective joint to be considerably reduced.

In particular, the heating unit, the spray unit, and the extrusion die have respective widths commensurate with the width of the annular junction portion. This is so that they can relatively quickly perform their respective operations along the annular junction portion and limit the number of revolutions about the annular junction portion.

In particular, the method involves controlling the positions of the heating unit, the spray unit, and the extrusion die along the annular path of the guide system by a control system for continuously monitoring the position of the same along the guide system.

In particular, the method involves controlling the operating status of the heating unit, the operating status of the spray unit, and the operating status of the extrusion die along the annular path of the guide system by a control system. It should thus be appreciated that based on the control system, it is possible to set the heating unit, the spray unit, and the extrusion die in active and rest mode according to their absolute and relative positions and their direction of advancement along the annular path.

In accordance with the present disclosure, the method involves advancing a carriage along the annular path of the guide system in a first direction about the annular junction portion and in a second direction opposite to the first direction—the heating unit, the spray unit, and the extrusion die being mounted on said carriage. This solution simplifies the construction of a machine used to implement the method that is the subject of the present disclosure and the operating modes.

In accordance with one embodiment of the present disclosure, the method involves heating the annular junction portion and applying the polymer material, by spraying, and the protective foil in sequence during one or more revolutions of the carriage about the annular junction portion.

In accordance with another embodiment of the present disclosure, the method involves advancing a further heating unit and a further spray unit, mounted on said carriage, along the annular path.

In accordance with this embodiment, the method involves heating the annular junction portion and applying the polymer material, by spraying, about the annular junction portion and applying the protective foil, once the application of the sprayed material is complete.

BRIEF DESCRIPTION OF THE FIGURES

Further characteristics and advantages of the present disclosure will become clear from the following description of example embodiments, with reference to the accompanying drawings, wherein.

DETAILED DESCRIPTION

Figure 1:
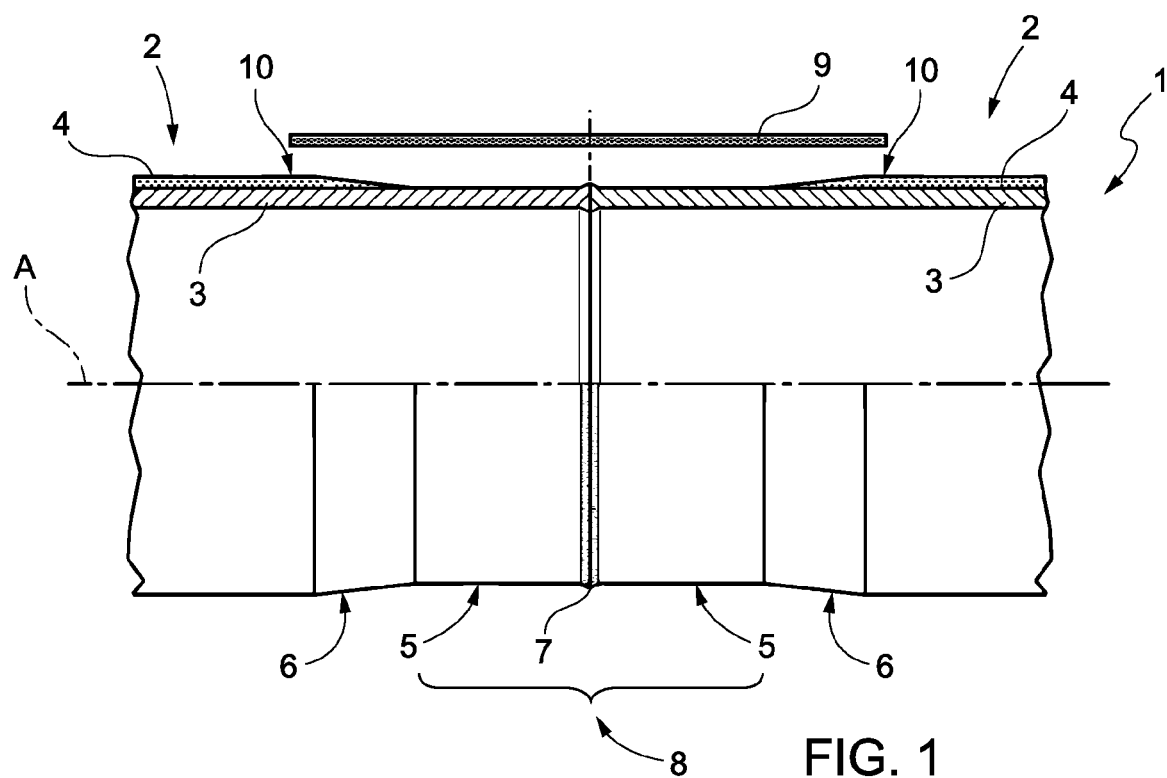
FIG. 1 is an elevated lateral view, with parts in cross-section and parts removed for clarity, of a pipeline and of a protective foil.
Figure 2:
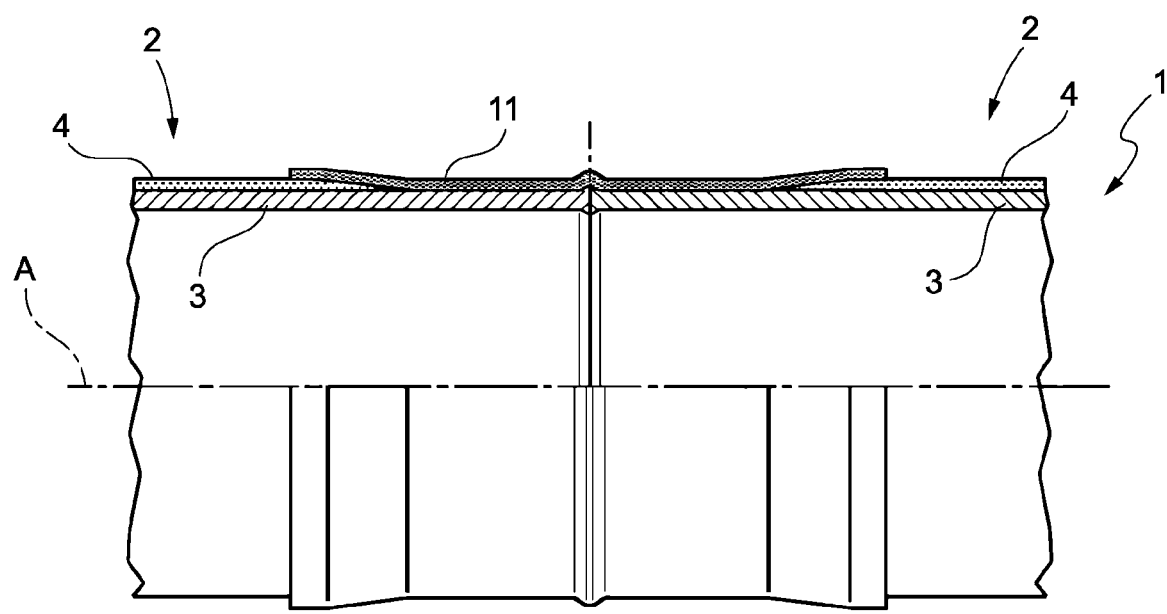
FIG. 2 is an elevated lateral view, with parts shown in cross-section and parts removed for clarity, of the pipeline and of a protective joint.

In FIGS. 1 and 2, 1 indicates a pipeline as a whole, which extends along a longitudinal axis A. In the case shown in FIG. 1, the pipeline 1 comprises two sections of pipe 2 aligned along the longitudinal axis A. Each section of pipe 2 comprises a metal cylinder 3 and a coating 4 made of polymer material, generally polyethylene or polypropylene, that is arranged in contact with the metal cylinder 3 and has the function of protecting the metal cylinder 3 from corrosion.

Each section of pipe 2 has two opposite free ends 5 (only one of which is shown in FIG. 1) without the coating 4, which has a chamfer 6 at each free end 5. Two successive sections of pipe 2, which are aligned along the longitudinal axis A, are arranged with the free ends 5 facing each other and they are welded together, possibly in several welding passes, so as to make an annular weld seam 7 between the two sections of pipe 2. The two sections of welded pipe 2 define an annular junction portion 8, which extends along the longitudinal axis A between the two chamfers 6 of the coating 4 and comprises the annular weld seam 7.

The pipeline 1 is formed by joining the sections of pipe 2. With reference to the present description, pipeline 1 is also understood to mean the pipeline under construction consisting, for example, of only two sections of pipe 2 joined together.

The joining of the sections of pipe 2 also involves, in addition to the welding of the metal cylinders 3, the making of a seamless coating of the pre-existing coatings 4. This operation involves applying a protective foil 9 about the annular junction portion 8 and about two end portions 10 of the coating 4. This operation also involves making the protective toil 9 adhere to the annular junction portion 8 and to the end portions 10 of the coatings 4.

The application of the protective foil 9 generally requires operations to prepare the surface of the annular junction portion 8 and of the end portions 10, in order to facilitate the adhesion of the protective foil 9. These operations consist in cleaning, for example, by blasting, and in heating, for example by induction, the annular junction portion 8.

The protective foil 9 has a thickness between 1 mm and 7 mm and is made of a polymer, such as polyolefin (e.g., polyethylene (PE) or polypropylene (PP)).

The protective foil 9 is wider than the width of the annular junction portion 8 (measured along the longitudinal axis A1) so that protective foil partially overlaps the coatings 4 at the respective end portions 10. In addition, protective foil is long enough to ensure the coverage of the perimeter of the annular junction portion 8, including the partial overlapping of the end edges of the protective foil 9.

The protective foil 9 is made by extrusion, and is applied about the pipeline 1. This technique enables the obtainment of a protective foil 9, which, in the application step, is relatively very flexible and well suited to the shape of the coating 4 and of the annular junction portion 8. The protective foil also adheres relatively closely to the pipeline 1 as shown in FIG. 2.

Prior to the application of the protective joint 9, a thin layer of polymer material, in particular epoxy material, is applied to the annular junction portion, which has the function of a primer, as well as a layer of polymer adhesive.

With reference to FIG. 2, when the protective foil 9 is applied to the pipeline and is attached to the annular junction portion 8 and to the end portions 10 of the coatings 4 protective foil forms the so-called protection joint 11.

Figure 3:
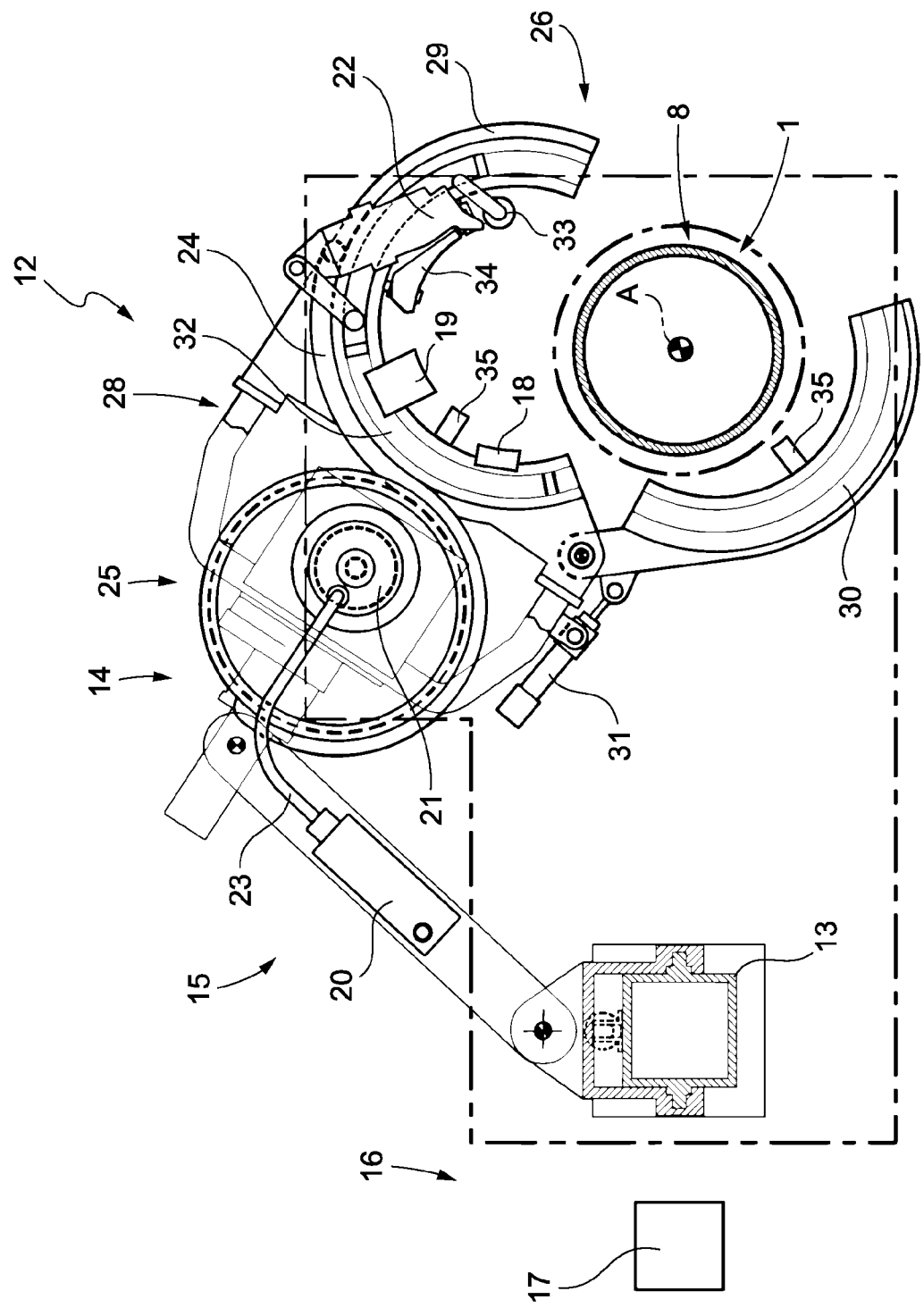
FIGS. 3 and 4 are views, with parts removed for clarity and parts in cross-section, of a machine configured to make the joint in FIG. 2 and arranged in two different operating steps.
Figure 4:
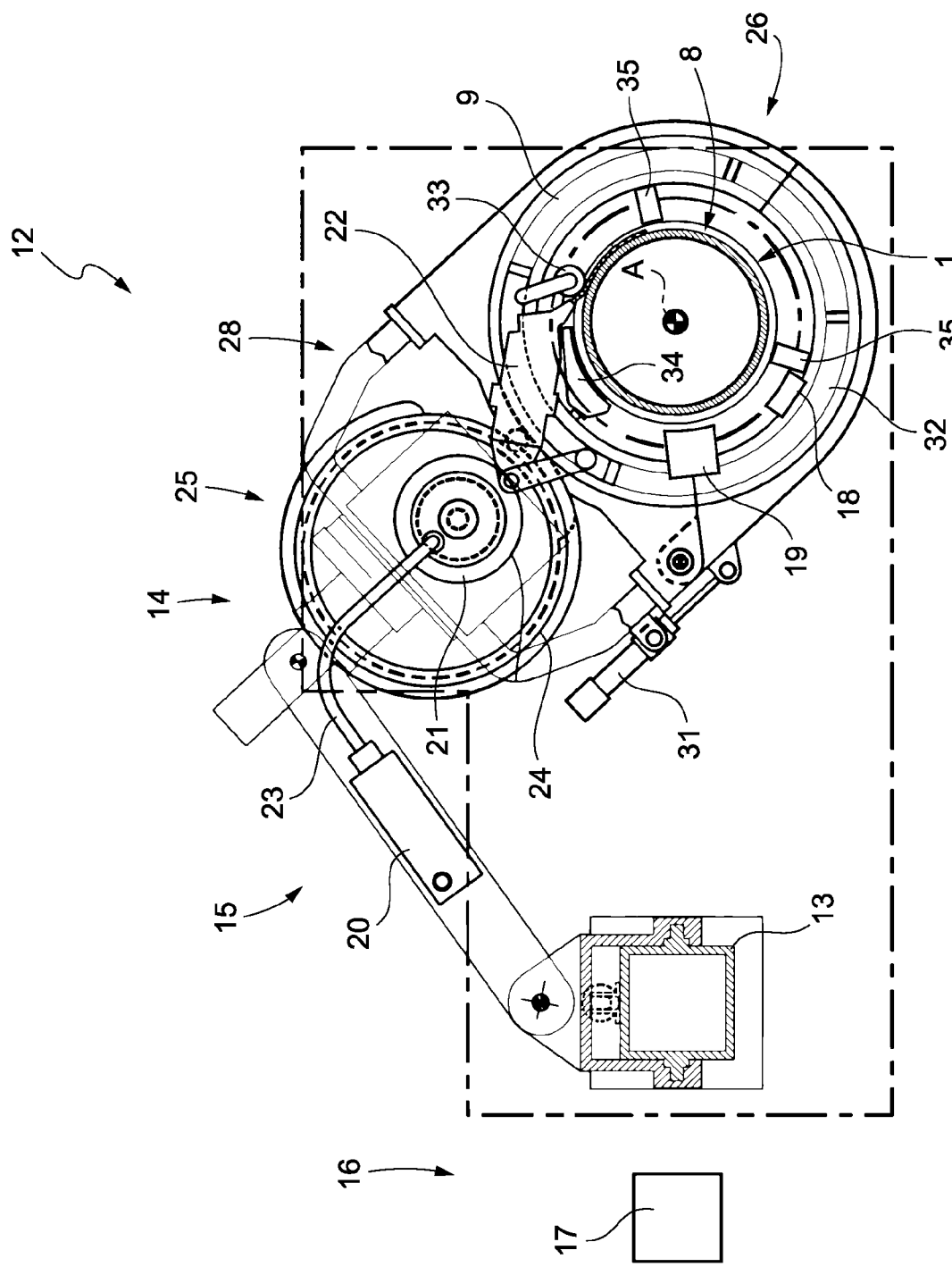
Figure 5:
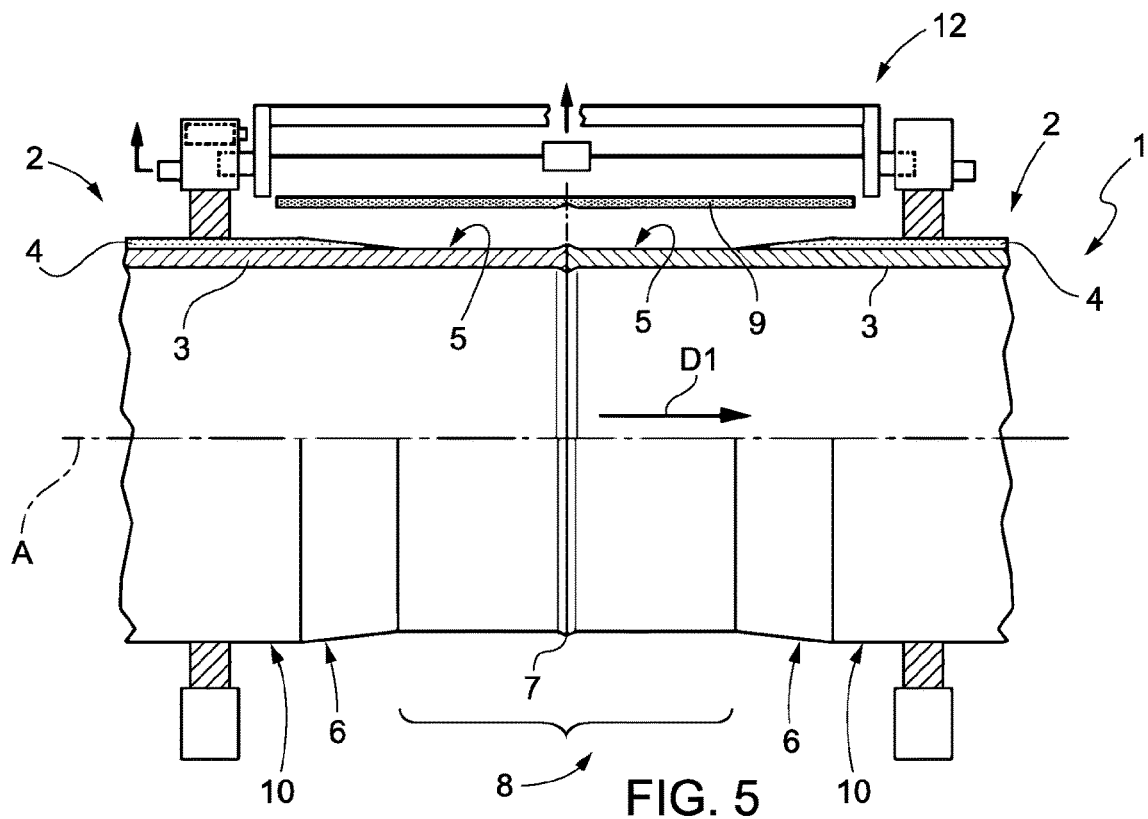
FIG. 5 is a schematic elevated lateral view, with parts in cross-section and parts removed for clarity, of the pipeline and of the machine for making a protective joint about the pipeline in FIG. 1.
Figure 12:
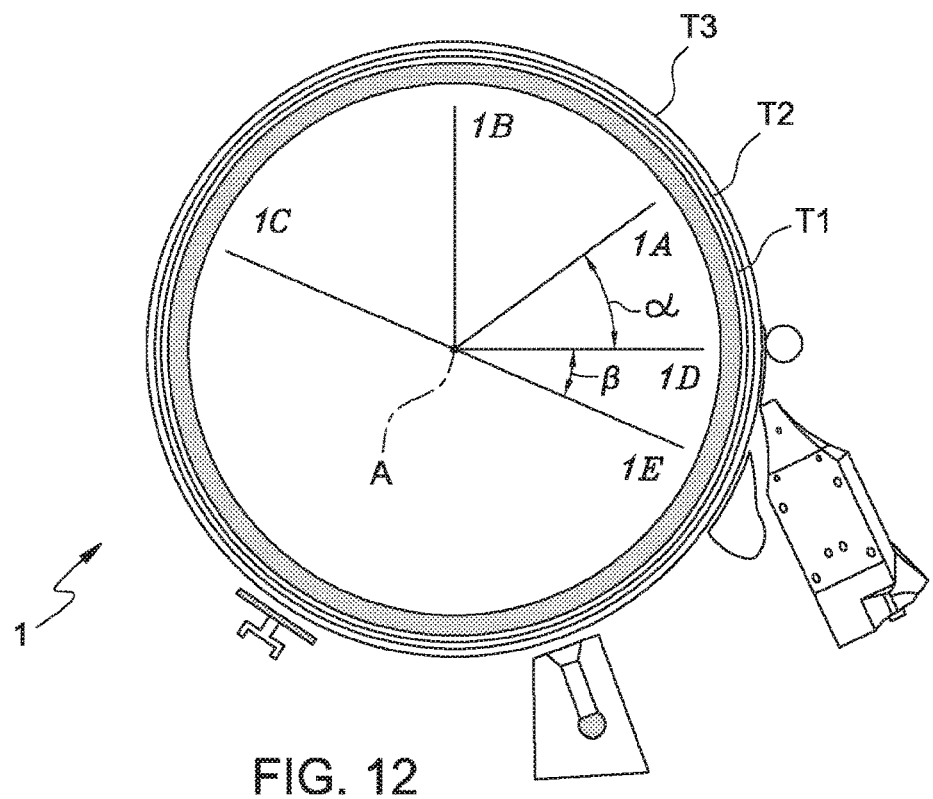

In FIGS. 3 and 4, 12 indicates a machine configured to heat the annular junction portion 8 (FIG. 1) and configured to apply the primer layer and, possibly, the adhesive layer, as well as the protective foil 9, to the pipeline 1 (FIG. 5).

The machine 12 is configured to perform machining cycles, each of which involves coupling to the pipeline 1 about an annular junction portion 8 (FIG. 4), heating the annular junction portion 8, spraying the primer layer and the adhesive layer, laminating the polymer material that makes up the protective foil 9 (FIG. 4), extruding and applying the protective foil 9 (FIG. 4) about the annular junction portion 8 of the pipeline 1, and uncoupling from the pipeline 1. For this reason, the machine 12 is configured to be arranged in a position wherein the machine is coupled to the pipeline 1 (FIGS. 4, 5) and in a position (FIG. 3) wherein the entire machine 12 is not coupled to the pipeline 1.

The construction of the pipeline 1 involves advancing the pipeline 1 step-by-step in a direction D1 (FIG. 5) parallel to the longitudinal axis A, and coupling the machine 12 (FIG. 4) about the pipeline 1 at the annular junction portion 8.

in the present description, the adjective "axial" refers to the longitudinal axis A of the pipeline 1.

In this case, the machine 12 comprises:
a frame 13;
an extrusion line 14 configured to laminate solid polymer material and extruding and applying the protective foil 9 (FIG. 5) in a paste state;
a mechanical manipulator 15 mounted on the frame 13 to selectively connect the extrusion line 14 to the pipeline 1;
a control system 16 including an electronic processor 17 and configured to coordinate the movements of the manipulator 15 with the movement of the pipeline 1 and to control the processes of heating, spraying the polymer material, and laminating and extruding in the extrusion line 14;
one heating unit 18; and
one spray unit 19.

The frame 13 has the function of supporting the manipulator 15, which supports the extrusion line 14, which comprises a laminating device 20, an extrusion device 21, and an extrusion die 22.

In accordance with the embodiment shown in the attached figures, the laminating device 20 is connected to the extrusion device 21 by a flexible conduit 23 so that the laminating device 20 and the extrusion device 21 can be arranged elements in relative motion.

Similarly, the extrusion die 22 and the extrusion device 21 are connected to each other by a further flexible conduit 24 so that the extrusion die 22 and the extrusion device 21 can be mounted on elements that are moveable relative to each other. The flexible conduit is collected on a winder 25 configured to wind and respectively unwind the flexible conduit 24 in a controlled manner.

In certain embodiments, the extrusion die 22 comprises an extrusion mouth having a through-cross-section to precisely shape the cross-section of the protective foil 9 (FIGS. 1, 5) to the desired dimensions; and a cavity (not shown in the drawings), to guide the polymer material in a paste state towards the extrusion mouth.

The manipulator 15 comprises a guide system 26 configured to guide the heating unit 18, the spray unit 19, and the extrusion die 22 along an annular path; an articulated mechanism 27 to selectively arrange the guide system 26 between a position about the pipeline 1 (FIG. 4) and a position relatively far from the pipeline 1 (FIG. 3).

Figure 6:
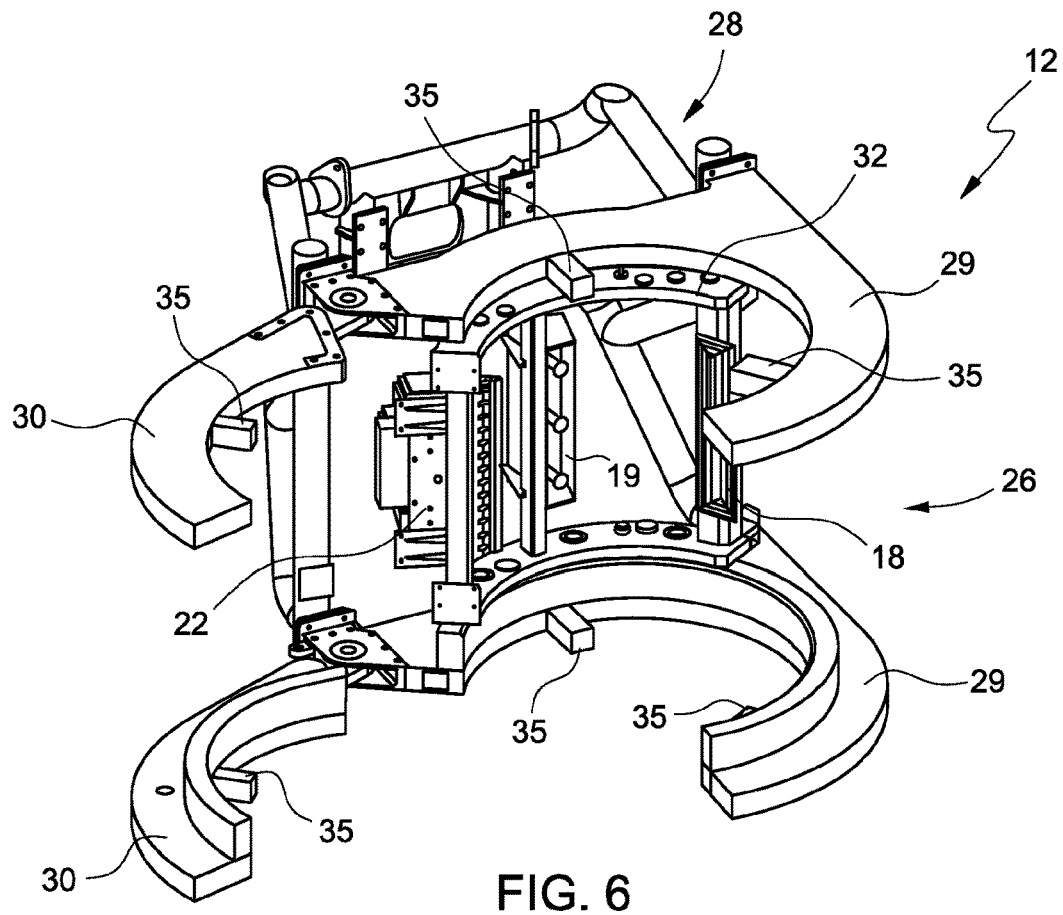
FIG. 6 is a perspective views, with parts removed for clarity of a detail of the machine in FIGS. 3 and 4.

With reference to FIG. 6, the guide system 26 comprises:
a supporting structure 28;
two rails 29 facing and parallel to each other, and attached to the supporting structure 28;
two moveable rails 30 facing and parallel to each other, which are hinged to the supporting structure 28 and complementary to the rails 29 to form a closed ring;
two actuators 31 configured to open and close the moveable rails 30 (FIGS. 4 and 5);
a carriage 32 selectively moveable along the rails, the annular path formed by the rails 29 and 30, and configured to support the heating unit 18, the spray unit 19, and the extrusion die 22.

With reference to FIG. 4, the carriage 32 supports one roller 33, and two lateral heaters 34 to heat the end portions of the coating 10 adjacent to the annular junction portion (FIGS. 1, 5). In addition, the rails 29 and 30 are equipped with spacers 35 configured to arrange the guide system coaxially to the longitudinal axis A of the pipeline 1.

With reference to FIG. 3, the rails 29 and 30, in the closed position, define their respective internal annular sites for the sliding of the carriage 32, which is motorized to advance autonomously along the rails 29 and 30.

The previously described embodiment of the machine 12 involves several functional modes, some of which are described below. It should be noted that the machine 12 is relatively extremely versatile and the choice of a functional mode depends on many factors such as, for example, the size of the pipeline, the thickness of the steel cylinder, and the power that the heating unit can deliver. It should be appreciated that the surface of the steel cylinder must reach a certain temperature before applying the polymers, in powder form, so as to ensure the adhesion and fusion of the powders in contact with the steel cylinder.

Figure 7:
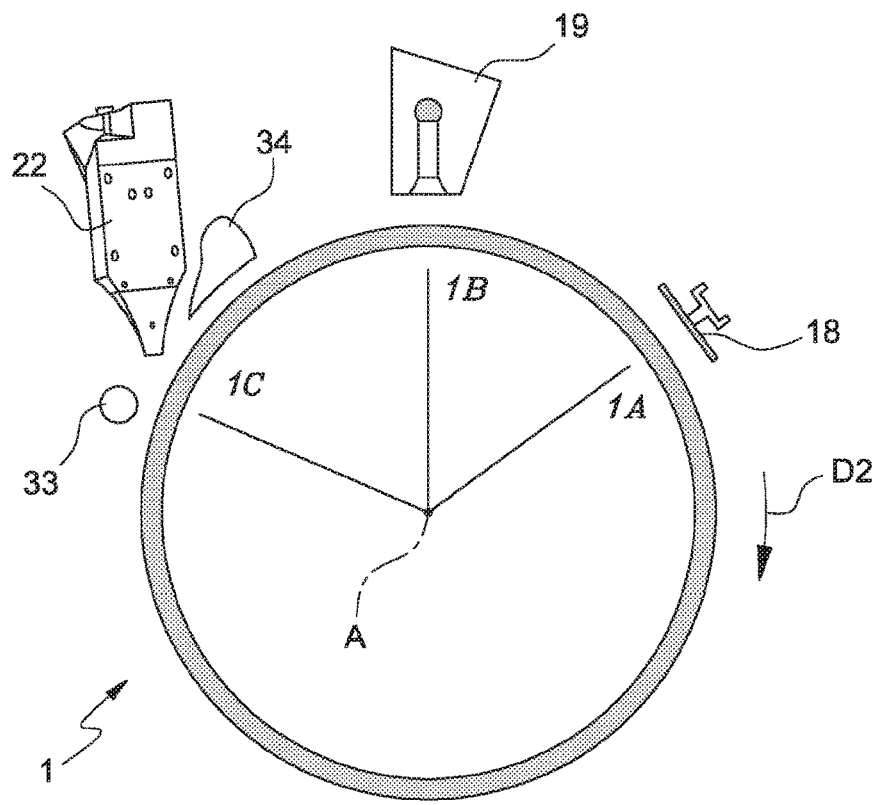
FIGS. 7 to 12 are schematic views, with parts removed for clarity, of the machine's operating steps in FIGS. 3 and 4.

With reference to FIG. 7, the heating unit 18, the spray unit 19, the extrusion die 22 are angularly offset about the pipeline 1 and are arranged respectively in positions 1A, 1B, and 1C.

The carriage 32 (not shown in the drawings) advances the heating unit 18, the spray unit 19, the extrusion die 22, the roller 33, and the lateral heaters 34 in direction D2 about the pipeline 1.

The heating unit 18 is immediately activated and heats the annular junction portion (FIG. 1) by induction, beginning with position 1A, while the spray unit 19 and the extrusion die 22, and the lateral heaters 34 remain inactive and the roller 33 is in the raised position.

Figure 8:
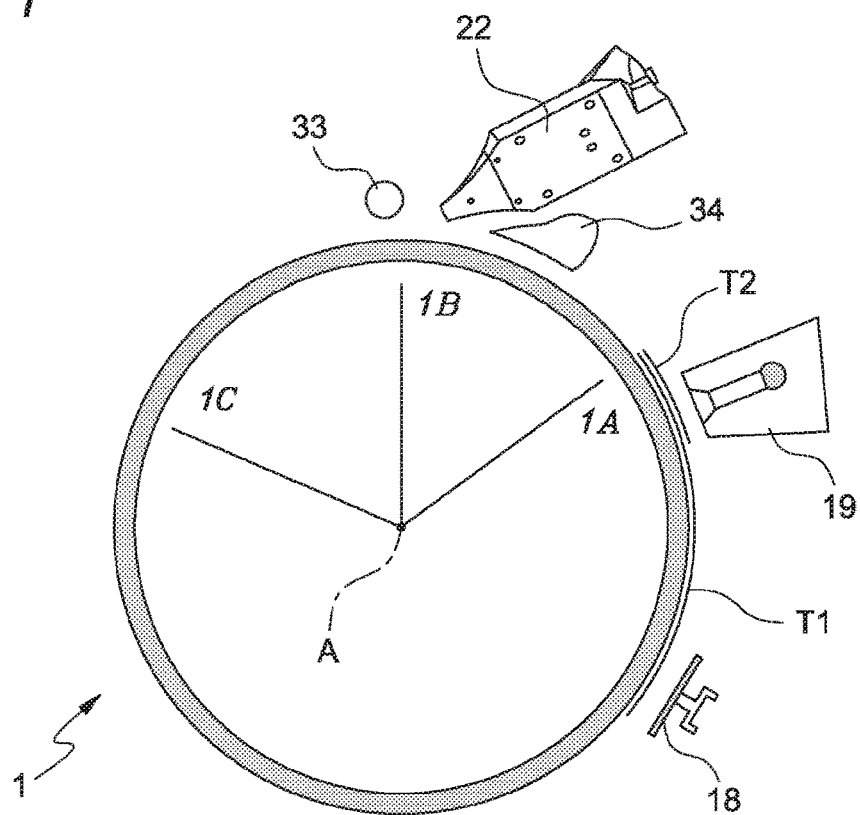

With reference to FIG. 8, the spray unit 19 is activated when the spray unit reaches position 1A to spray the primer and, possibly, in relatively quick succession the adhesive polymer on the already heated length. In FIG. 8, T1 indicates the heated length, while T2 indicates the length along which the powders have been applied.

In FIGS. 9 to 12, in addition to lengths T1 and T2, T3 indicates a length along which the protective material foil is applied.

Figure 9:
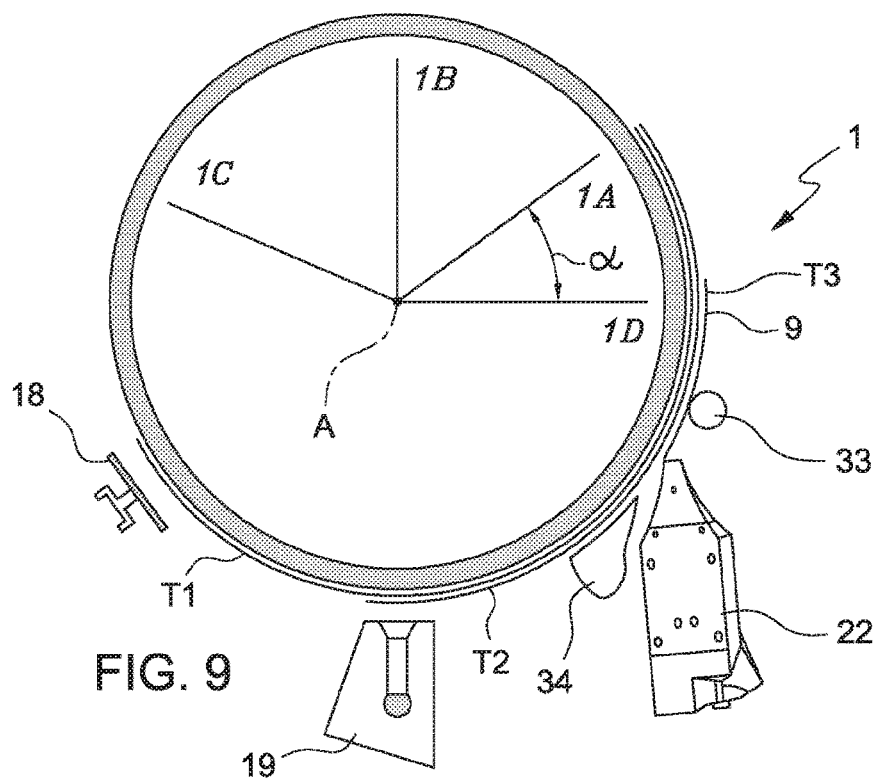

With reference to FIG. 9, the extrusion die 22 is activated in position 1D when extrusion die has passed position 1A by an angle α. The lateral heaters 34 are activated simultaneously with the extrusion die 22 and heat the lateral portions 10 of the coating 4 with infrared, flames, or hot air. Soon after the activation of the extrusion die 22, the roller 33 is lowered to compress the protective foil 9 on the pipeline 1 (FIG. 4).

Figure 10:
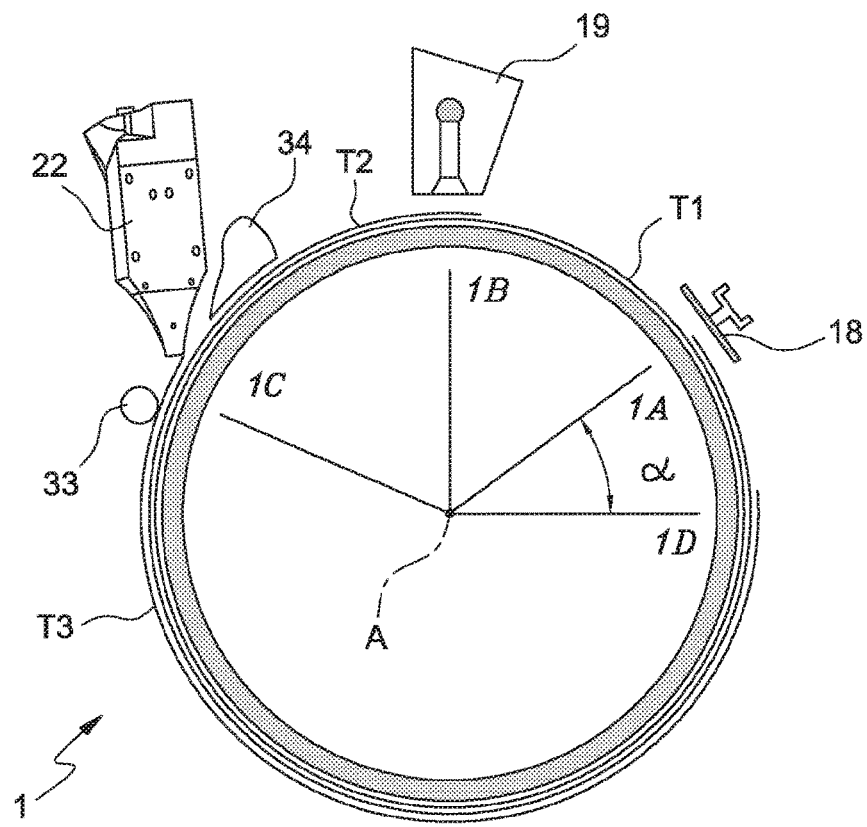

With reference to FIG. 10, when the heating unit 18 reaches position 1A after making a 360° revolution about the pipeline, the heating unit is deactivated.

Figure 11:
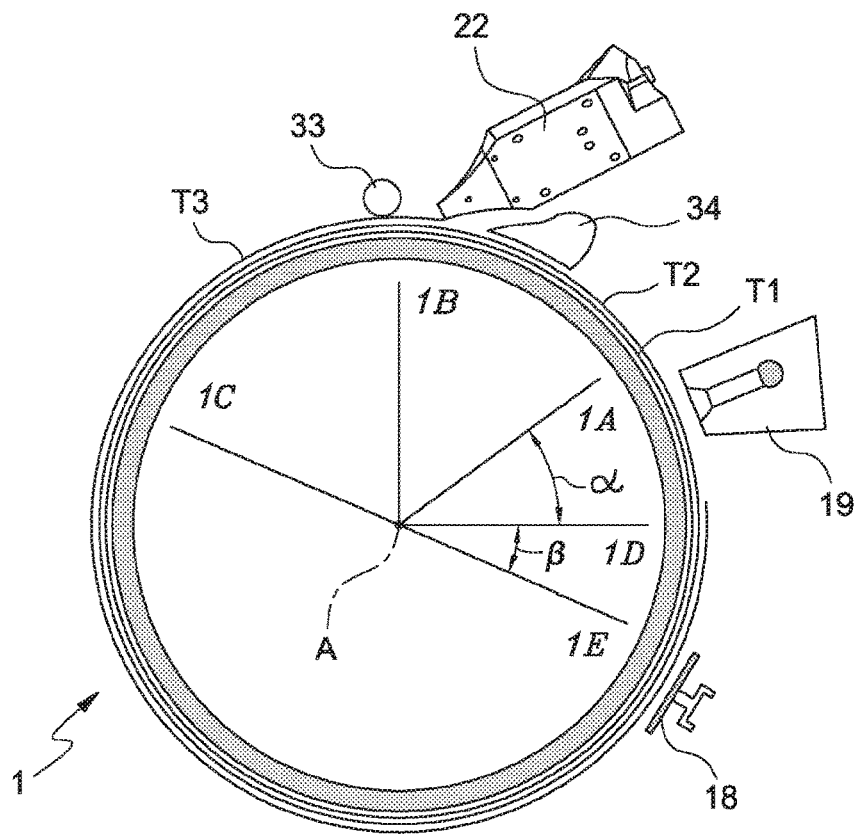

In FIG. 11, the spray unit 19 has passed position 1A and is, therefore, deactivated, while the extrusion die 22, the roller 33, and the lateral heaters 34, remain operational until they reach position 1E (FIG. 12), which is spaced from position 1D by an angle β. This solution enables the joining of the protective foil 9 along the β angle. In practice, with a revolution slightly higher than 360°, a plurality of operations are carried out, in relative quick succession, on the pipeline 1.

Figure 13:
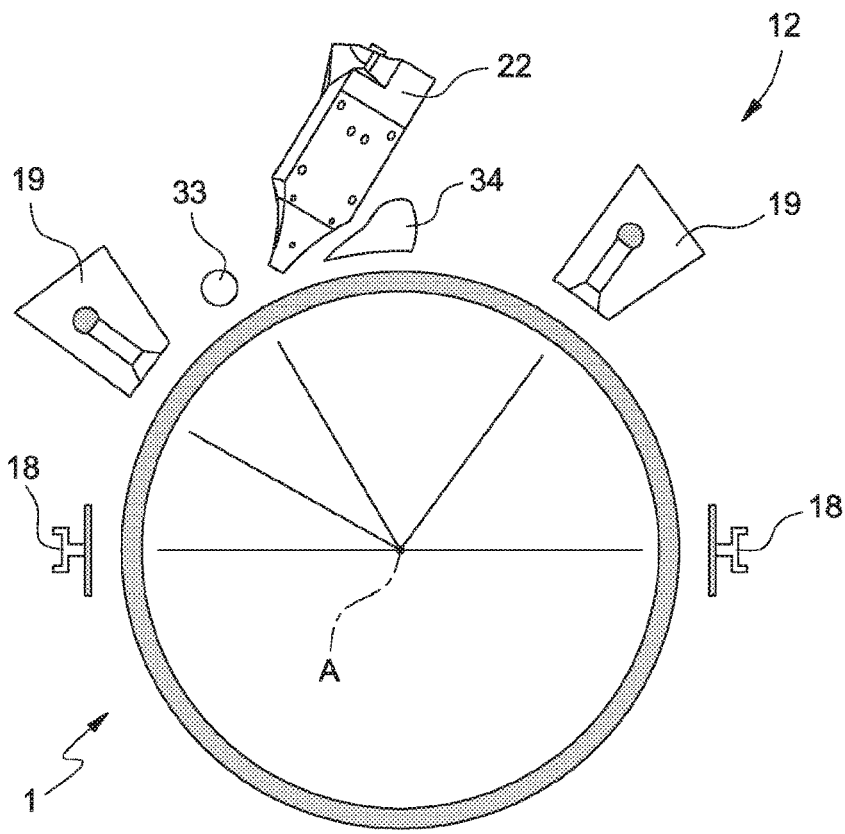
FIG. 13 is a schematic view, with parts removed for clarity, of a variation of the machine in FIGS. 3 and 4.

In accordance with the variant in FIG. 13, the machine 12 comprises a further heating unit 18 and a further spray unit 19 mounted on the carriage 32 (not shown in the drawings). The two heating units 18 are arranged at opposite ends of the carriage and at 180° to each other, while each spray unit 19 is arranged between the extrusion die 22 and a respective heating unit 18. When in use, the heating and powder spraying operations are performed along a 180° sector by a heating unit 18 and the adjacent spray unit 19, while the other heating unit 18 and the other spray unit 19 are not in the operating mode. During the return stroke, the remaining 180° sector is heated and coated with powders by the heating unit 18 and the spray unit 19, which have remained inactive during the forward stroke, while the heating unit 18 and the spray unit 19, which are active during the forward stroke, are deactivated. Subsequently, both the heating units 18 and both the spray units 19 are deactivated, while the extrusion die 22, the roller 33, and the lateral heaters are operational and advanced along a sector slightly greater than 360°.

Figure 14:
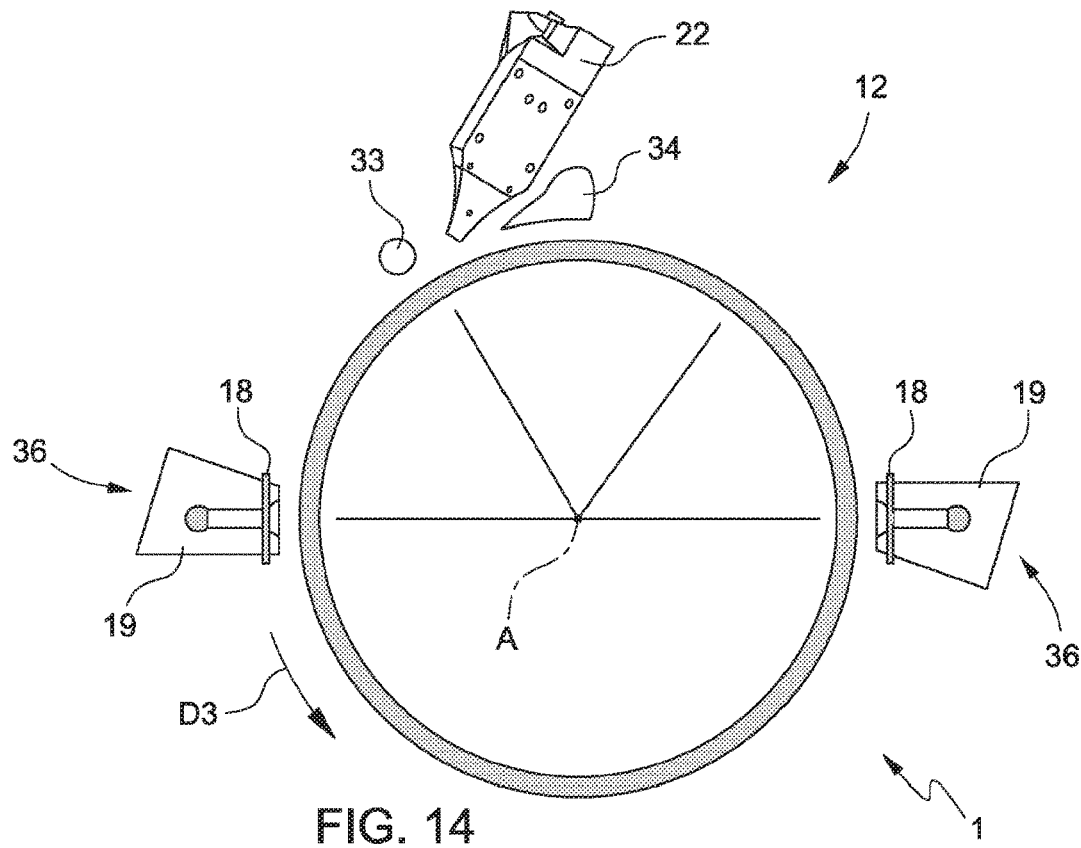
FIG. 14 is a schematic view, with parts removed for clarity, of a further variant of the machine in FIGS. 3 and 4.

In the variant in FIG. 14, the machine comprises two assemblies 36, each of which comprises a heating unit 18 and two mutually integrated spray units 19. In practice, each heating unit 18 comprises a U-shaped conductor that extends about a plurality of nozzles. The two assemblies 36 are arranged at 180° from each other. When in use, the heating and polymer material powder-spraying operations can be carried out simultaneously, so that, by a 180° advance in direction D3, it is possible to heat and apply the powder over a 360° sector. In addition, with an advancement of slightly more than 360° in the opposite direction, the protective foil 9 is applied (FIG. 1).

As an alternative to the functional modes described above, the heating unit may perform complete or partial revolutions about the annular junction portion when the temperature of the annular junction portion has reached the predetermined temperature. Subsequently, the powders are applied by the spray unit.

The heating unit can also be activated during the powder application step so that the heating unit heats portions of the annular junction portion, on which the powders have already been applied. This functional mode has the main function of preventing the cooling of the annular junction portion.

In accordance with another variant (not shown in the drawings), one or more heating units and one or more spray units, and the extrusion die are distributed on two carriages, which are controlled independently of each other.

The present disclosure extends to further variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A machine comprising:

a guide system selectively clampable about a pipeline on opposite sides of an annular junction portion of the pipeline, wherein the guide system defines an annular path about the annular junction portion;

a heating unit moveable along the annular path and configured to heat the annular junction portion;

a spray unit moveable along the annular path and configured to apply a polymer material to the annular junction portion; and an extrusion die moveable along the annular path and configured to apply a protective foil about the annular junction portion.

2. The machine of claim 1, wherein:

the heating unit has a width commensurate to a width of the annular junction portion and the heating unit is configured to heat the annular junction portion in one revolution about the annular junction portion, the spray unit has a width commensurate to the width of the annular junction portion and the spray unit is configured to apply the polymer material to the annular junction portion in one revolution about the annular junction portion, and the extrusion die has a width commensurate to the width of the annular junction portion and the extrusion die is configured to apply the protective foil about the annular junction portion in one revolution about the annular junction portion.

3. The machine of claim 1, further comprising a control system configured to control a position of the heating unit along the annular path, a position of the spray unit along the annular path, and a position of the extrusion die along the annular path.

4. The machine of claim 1, further comprising a control system configured to control an operating status of the heating unit, an operating status of the spray unit, and an operating status of the extrusion die.

5. The machine of claim 1, further comprising a carriage advanceable along the annular path in a first direction about the annular junction portion and advanceable in a second direction opposite to the first direction, wherein the heating unit, the spray unit and the extrusion die are each mounted on the carriage.

6. The machine of claim 5, wherein the heating unit, the spray unit and the extrusion die are sequentially arranged along the carriage.

7. The machine of claim 5, further comprising another heating unit and another spray unit mounted on the carriage.

8. The machine of claim 7, wherein the heating unit and the other heating unit are mounted on opposite ends of the carriage.

9. The machine of claim 7, wherein the heating unit and the other heating unit are mounted 180° apart from each other.

10. The machine of claim 7, wherein each spray unit is mounted between the extrusion die and one of the heating units.

11. The machine of claim 1, wherein the heating unit and the spray unit are part of an assembly comprising:

a plurality of nozzles distributed along a direction parallel to a longitudinal axis of the pipeline, and a U-shaped inductor arranged about the plurality of nozzles.

12. A method for making a protective joint about an annular junction portion of a pipeline, the method comprising:

clamping a guide system to the pipeline about the annular junction portion, wherein the guide system defines an annular path about the annular junction portion;

simultaneously advancing a heating unit, a spray unit, and an extrusion die along the annular path;

heating, via the heating unit, the annular junction portion;

applying a polymer material, via the spray unit, to the annular junction portion;

applying a protective foil, via the extrusion die, about the annular junction portion and end portions of a coating that delimits the annular junction portion; and uncoupling the guide system from the pipeline.

13. The method of claim 12, wherein:

the heating unit has a width commensurate to a width of the annular junction portion such that heating the annular junction portion occurs in one revolution about the annular junction portion, the spray unit has a width commensurate to the width of the annular junction such that applying the polymer material to the annular junction portion occurs in one revolution about the annular junction portion, and the extrusion die has a width commensurate to the width of the annular junction portion such that applying the protective foil about the annular junction portion occurs in one revolution about the annular junction portion.

14. The method of claim 12, further comprising controlling, via a control system, a position of the heating unit along the annular path, a position of the spray unit along the annular path, and a position of the extrusion die along the annular path.

15. The method of claim 12, further comprising controlling, via a control system, an operating status of the heating unit, an operating status of the spray unit, and an operating status of the extrusion die.

16. The method of claim 12, further comprising advancing a carriage along the annular path in a first direction about the annular junction portion and advancing the carriage in a second direction opposite to the first direction about the annular junction portion, wherein the heating unit, the spray unit and the extrusion die are each mounted to the carriage.

17. The method of claim 12, wherein heating the annular junction portion, spraying the polymer material and applying the protective foil sequentially occurs during a revolution of the carriage in a first direction about the annular junction portion and returning the carriage occurs in a revolution of the carriage in a second direction opposite to the first direction.

18. The method of claim 12, further comprising advancing along the annular path another heating unit and another spray unit.

19. The method of claim 12, wherein applying the protective foil occurs after the polymer material has been applied along the entire annular junction portion.

* * * * *